(12) United States Patent
Marsaly et al.

(10) Patent No.: US 8,578,567 B2
(45) Date of Patent: Nov. 12, 2013

(54) CLAMP COLLAR AND RUN-FLAT DEVICE INCORPORATING SAME

(75) Inventors: Olivier Marsaly, L'isle Adam (FR); Stéphane Auvray, Lamorlaye (FR)

(73) Assignee: Hutchinson, Paris (FR)

( * ) Notice: Subject to any disclaimer, the term of this patent is extended or adjusted under 35 U.S.C. 154(b) by 650 days.

(21) Appl. No.: 12/732,955

(22) Filed: Mar. 26, 2010

(65) Prior Publication Data

US 2011/0030869 A1  Feb. 10, 2011

(30) Foreign Application Priority Data

Mar. 27, 2009  (FR) ...................................... 09 01520

(51) Int. Cl.
*F16B 2/08* (2006.01)
*B60C 17/04* (2006.01)

(52) U.S. Cl.
USPC ............................................. 24/279; 152/520

(58) Field of Classification Search
USPC ............... 24/279–286; 152/520, 381.5, 381.6
See application file for complete search history.

(56) References Cited

U.S. PATENT DOCUMENTS

| | | | | |
|---|---|---|---|---|
| 2,352,372 A | * | 6/1944 | Colarusso ......................... | 24/286 |
| 2,580,396 A | * | 1/1952 | Bluth ............................. | 411/516 |
| 2,864,638 A | * | 12/1958 | Nelson et al. ............. | 292/256.69 |
| 3,429,014 A | * | 2/1969 | Roche ............................. | 24/279 |
| 4,327,791 A | * | 5/1982 | Strader .......................... | 152/158 |
| 4,468,842 A | | 9/1984 | Perry et al. | |
| 4,681,147 A | * | 7/1987 | Hugele .......................... | 152/158 |
| 5,504,978 A | * | 4/1996 | Meyer, III ................... | 24/274 R |
| 2008/0164691 A1 | * | 7/2008 | Meinig ........................... | 285/18 |

FOREIGN PATENT DOCUMENTS

| | | |
|---|---|---|
| EP | 0 798 141 A1 | 10/1997 |
| FR | 2913917 A1 * | 9/2008 |
| JP | 2008260508 A * | 10/2008 |

OTHER PUBLICATIONS

Preliminary Search Report for Application No. FR 09 01520 dated Oct. 1, 2009.

* cited by examiner

*Primary Examiner* — James Brittain
(74) *Attorney, Agent, or Firm* — Alston & Bird LLP

(57) ABSTRACT

A clamp collar of the annular band type is provided, and includes a connecting mechanism for connecting at least one pair of adjacent ends of the band, and to a run-flat device intended to be fitted to a motor vehicle mounted assembly incorporating same. This clamp collar includes a band, preferably made of metal, having at least one pair of ends spaced apart in the circumferential direction, connecting mechanism for connecting the or each pair of ends together with adjustable tightening in this direction and a locking member for locking the connecting mechanism. The locking member is mounted solid with one of these ends being able to occupy an unlocked position in which it is disengaged from the connecting mechanism for tightening and loosening the collar and a locked position in which it engages with them to oppose this loosening.

12 Claims, 4 Drawing Sheets

CLAMP COLLAR AND RUN-FLAT DEVICE INCORPORATING SAME

FIELD OF THE INVENTION

The present invention relates to a clamp collar of the annular band type provided with connecting means for connecting at least one pair of adjacent ends of the band, and to a run-flat device intended to be fitted to a motor vehicle mounted assembly. In general, such a clamp collar is intended to clamp one or more walls of at least partially cylindrical geometry, such as, for example, a radially external support face of a run-flat device that is to be held against a wheel rim, although the invention can also be applied to the connecting of pipes or hoses, without implying any limitation.

BACKGROUND OF THE INVENTION

Documents DE-A1-39 26 626 and FR-A-2 902 175 disclose how to connect the two adjacent ends of a metal band of a clamp collar using a screw fitted with a nut and mounted through the loops respectively formed by these ends.

One major disadvantage of the clamp collars disclosed in those documents is that the mechanical safety of the tightening achieved by the screw-nut assembly is not entirely ensured under use, in as much as unwanted loosening of the tightening nut and therefore of the entire band may occur, for example under the effect of deformation of the wall or walls clamped by this clamp collar and/or of vibrations.

Document WO-A1-2008/132348 discloses a clamp collar intended to clamp an annular run-flat device to keep it in contact with the rim under running conditions and the tightening band of which may be of the metal type, the tightness of which can be adjusted and locked using mechanical means, for example via journals.

SUMMARY OF THE INVENTION

It is an object of the present invention to propose a clamp collar comprising a band, preferably made of metal, having at least one pair of ends spaced apart in the circumferential direction, connecting means for connecting the or each pair of ends together with adjustable tightening in this direction and a locking member for locking these connecting means, which clamp is able to overcome the aforementioned disadvantage by guaranteeing, via the locking member, reliable tightening of the clamp collar in use, even under high radial stress.

To this end, a clamp collar according to the invention is such that this member is mounted solid with one of these ends and is able to occupy an unlocked position in which it is disengaged from these means for tightening and loosening the clamp collar and a locked position in which it engages with them to oppose this loosening.

According to another feature of the invention, the connecting means are able to move said ends closer together or further apart through a rotation applied to these means in a direction of tightening or of loosening the clamp collar respectively, and the locking member may then be designed to oppose the turning of these means in the locked position.

According to another feature of the invention, the connecting means may comprise at least one cylindrical shank having, at its respective end portions, two screw threads of opposite hand which are guided in rotation in two first and second transverse journals fixed to said ends that are to be connected, under the control of an operating member that operates this shank and rotates as one with a central portion thereof, it then being possible for the locking member to be pivot-mounted on the first journal so that it can cooperate by abutment with this operating member in the locked position.

It will be noted that provision may advantageously be made for each end portion of the shank to have a coarse multiple screw thread so that this shank can be tightened/loosened quickly.

Advantageously, the locking member may then be formed of an articulated yoke having two flanges which are pivot-mounted on said first journal while extending laterally on each side thereof and ending in a locking section designed to closely surround said operating member in the locked position so as to prevent it from turning.

More advantageously still, this locking member may be in the form of a multi-flat nut, for example having six flats, said locking section possibly then having a cross section substantially in the shape of an inverted U designed to be mounted in contact with said operating member in the locked position, with the flanges of the U along its sides and the web of this U over its top.

According to a first embodiment of the invention, said locking section is able to be clipped reversibly around said operating member, while being compressed elastically against edge corners of these flats of the nut, at least by said flanges. The material used for the locking member is then designed to be flexible enough that this clip-fastening could be achieved and strong enough that it prevents the turning of the operating member and therefore of the threaded shank. This material may, for example, be a spring steel. As an alternative, provision may be made for a non-deformable metal reinforcement to be added to the internal face of the locking section, the inverted U espousing the contour of this section in order to stiffen it (so as to prevent the turning of the threaded shank), with the exception of the free ends of the flanges of the U of this section which would then have no such internal reinforcement thus giving these ends of the flanges the flexibility they need in order to clip onto the operating nut.

According to a second embodiment of the invention, said locking section is able to come into contact with said operating member by said flanges and said web of the U, this section also being fitted with a transverse pin, for example of the beta type, mounted removably through these flanges and directly under the operating member in the locked position. In this case, the material of the locking member needs to be rigid (e.g. some steel or another) and strong enough that it prevents the operating member—threaded shank assembly from turning.

According to another feature of the invention, said ends that are to be connected may be curved radially outward and in opposite directions from one another each forming a loop of one piece with the remainder of the band, said journals being enveloped by the respective curved parts of these loops and being immobilized therein by retaining means. The curved part of each end that is to be connected may then be holed to allow the respective screw threads of said shank to pass, which screw threads are respectively guided in two open-ended tapped orifices formed in said journals with tappings of opposite hand.

According to one embodiment of the invention, said retaining means of each journal comprise two elastic rings which surround the two lateral ends of at least said second journal (i.e. of at least the journal to which the locking member is not articulated) so as to prevent any lateral translational movement of this/these journal/journals in the corresponding loop (s). It thus becomes possible to dispense with these elastic retaining rings on said first journal (i.e. on the one that bears the locking member) by planning for this member itself to be capable of preventing the translational movement of the first journal in the loop that accommodates it.

A run-flat device according to the invention is intended to be fitted to a tubeless mounted assembly for a motor vehicle which comprises a wheel rim and a tire mounted on the rim, the device being intended to support the tire following a drop in inflation pressure, and comprising:

a support ring having a radially external support face which is intended to support the tire under run-flat conditions and in which at least one radial recess is formed circumferentially, and at least one clamp collar surrounding the ring so as to keep it substantially in contact with the rim under running conditions and which is pressed against this radial recess set back into the support face, this clamp collar being as defined hereinabove.

BRIEF DESCRIPTION OF THE DRAWINGS

Other features, advantages and details of the present invention will become apparent from reading the following description of a number of exemplary embodiments of the invention, these having been given by way of nonlimiting illustration, said description being given with reference to the attached drawings, among which.

DETAILED DESCRIPTION OF THE INVENTION

Figure 1:
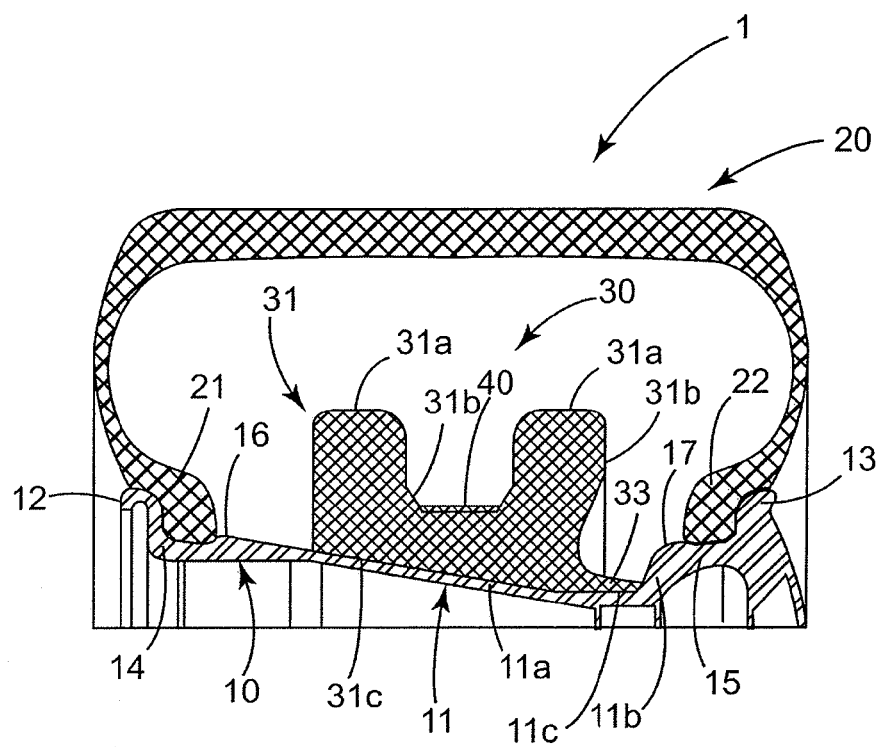
FIG. 1 is a half axial section of a mounted assembly the run-flat device of which incorporates a clamp collar according to the invention.

FIG. 1 illustrates one of a number of possible uses of a clamp collar 40 according to the invention, it being emphasized that this invention is not in any way restricted to this application to a motor vehicle mounted assembly and that it encompasses other uses of this clamp, such as for connecting pipes or hoses for example.

The mounted assembly 1 of FIG. 1 comprises an asymmetric wheel rim 10 of the one-piece type comprising a circumferential rim gutter 11, a tire 20 mounted against axially internal and external flanges 12 and 13 of the rim 10, and a run-flat device 30 mounted in the rim gutter 11 and intended to support the tire 20 following a drop of inflation pressure inside the mounted assembly 1. The rim 10 has axially internal and external rim seats 14 and 15 respectively intended to accept the beads 21, 22 of the tire 20, each rim seat 14, 15 being axially delimited by one of the flanges 12, 13 and, optionally in the example of FIG. 1, by an adjacent circumferential hump 16, 17.

In this exemplary embodiment, the rim gutter 11 has an essentially sloping bottom 11a slightly inclined axially toward the outside and radially toward the inside and which is axially delimited on the inside by the hump 16 and axially on the outside by an axially external side wall 11b, which extends axially and especially radially inward from the adjacent hump 17. More specifically, the bottom 11a of the rim gutter 11 ends axially toward the outside in a short substantially horizontal bearing surface 11c extended by the wall 11b.

The device 30 to be mounted on this bottom 11a comprises:
a one-piece support ring 31 made of an elastomeric or plastic material, substantially in the shape of a U in this exemplary embodiment and having a radially external support face 31a which is intended to support the tire 20 under run-flat conditions and in which a circumferential groove 31b defined by the base of the U is formed, and
an annular metal clamp collar 40 applied to the groove 31b, being radially set back from the support face 31a (defined in FIG. 1 by the radially outer tops of the two flanges of the U) and in such a way as to clamp the ring 31, so as to keep it in contact with the rim 10 under running conditions.

As illustrated in FIG. 1, the depth of the groove 31b is relatively great in relation to the mean radial height of the ring 31 being, for example, equal to approximately half of this mean radial height separating the support face 31a from the radially internal face 31c of the ring 31.

This radially internal face 31c is designed to espouse the axial profile of the rim gutter 11, i.e. in this example, both the sloping main portion 11a and the bearing surface 11c thereof. For that, the ring 31 comprises means 33 for wedging it in the rim gutter 11, these means in this example consisting of a circumferential lip formed axially projecting from the axially external lateral face 31d of the ring 31 and which forms an integral part of the ring 31. This wedging lip 33 has an axial width of the order of that of the bearing surface 11c, being designed to press against the latter and to be in contact with the external side wall 11b of the gutter 11.

Regarding the use of a clamp collar 40 according to the invention in relation to a run-flat device, it will be noted that the example of FIG. 1 is nonlimiting and reference may for example, be made to the aforementioned document WO-A1-2008/132348 for other embodiments of a mounted assembly that can accept one or more collars 40 according to the invention.

Figure 2:
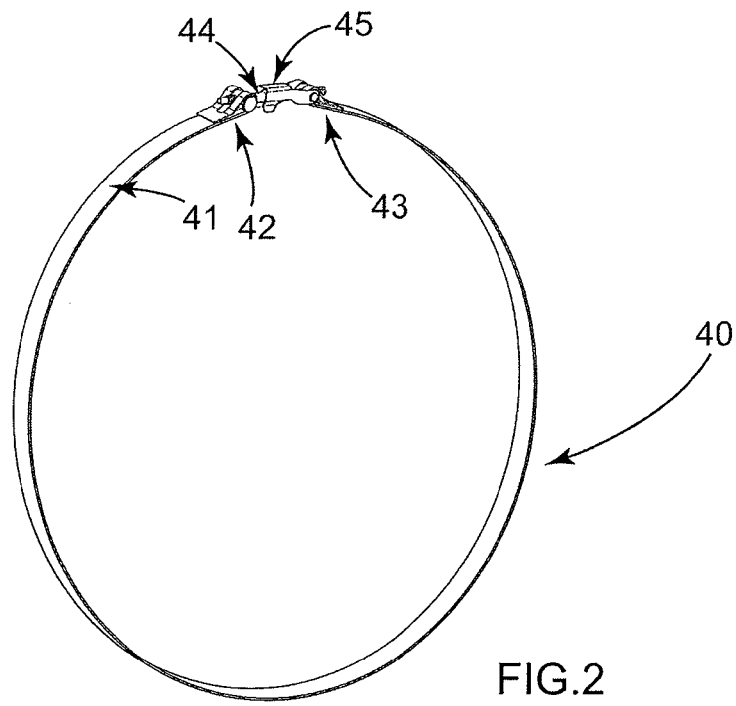
FIG. 2 is a perspective view of a clamp collar according to the first embodiment of the invention, showing the locking member in the locked position around the connecting means that connect the ends of the clamp.
Figure 6:
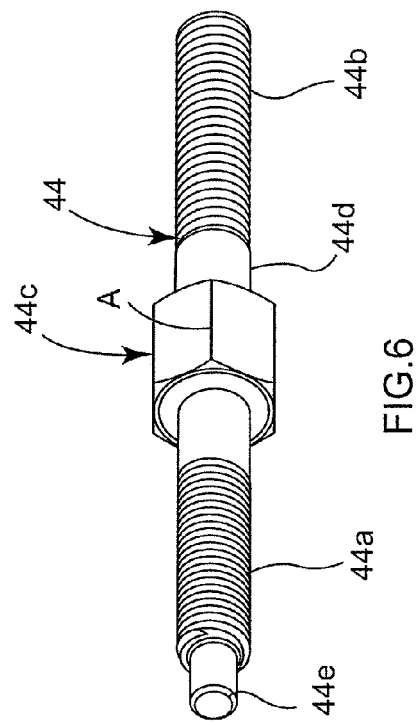
FIG. 6 is a perspective view of just the connecting means of the clamp collar according to FIGS. 2 to 5, in a preferred embodiment of the invention.

As illustrated in FIG. 2, the collar 40 according to the invention consists of a band 41, formed of an annular strip preferably made of metal, of which at least one pair of ends 42 and 43 are connected together by adjustable-tightening connecting means 44 which can be locked by a locking member 45 pivot-mounted at one end 43 (just one pair of ends 42, 43 connected with this lockable tightening is depicted in FIG. 2, it being understood that a collar 40 according to the invention could have several lockable tightening points). For this, these connecting means 44 consist of a cylindrical shank of the stud type ending in two screw threads 44a and 44b of opposite hand guided in rotation in two transverse journals 42a and 43a fixed to the ends 42, 43 which is to be connected, under the control of an operating nut 44c that operates the shank 44, for example with six flats (visible in FIGS. 3, 6 and 7), which rotate as one with a central portion 44d of this shank 44.

More specifically, the ends 42 and 43 that are to be connected are curved radially outward and in opposite directions from one another each forming a part 42b, 43b bent over at 180° in the form of a loop ending in a flat 42c, 43c surmounting the radially external face of the band 41. As for each journal 42a, 43a, it is enveloped by the curved part 42b, 43b of the corresponding loop, being wedged therein in the example of FIGS. 3 and 4 by a pair of elastic retaining rings 42d secured to this loop and respectively clamping the lateral ends of this journal 42a, 43a. Each curved part 42b, 43b is holed to allow the corresponding screw thread 44a, 44b of the shank 44 to pass, which thread is guided in an open-ended tapped orifice formed in the relevant journal 42a, 43a (the tapped orifice in the other journal 43a, 42a, has a tapping of opposite hand).

Figure 3:
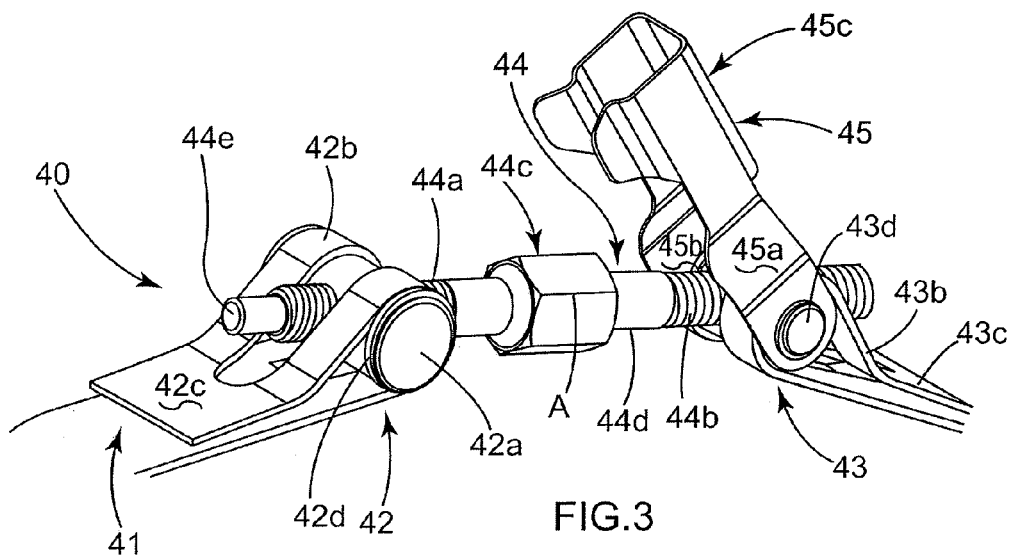
FIG. 3 is a partial perspective view of the clamp collar of FIG. 2, showing in detail how the locking member is arranged around the connecting means in an unlocked position.
Figure 4:
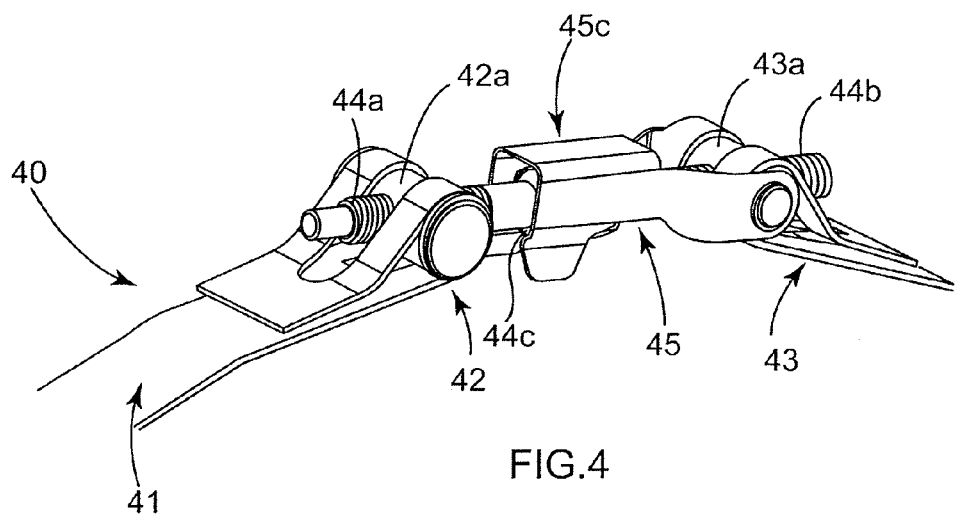
FIG. 4 is a partial perspective view of the clamp collar of FIG. 2 showing, starting out from the unlocked position of FIG. 3, how the locking member is fitted around the connecting means in the locked position.
Figure 5:
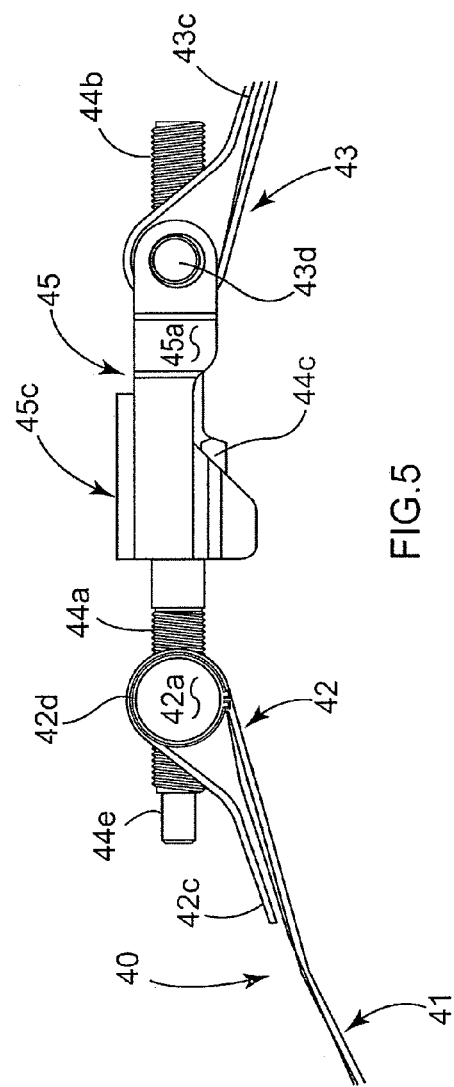
FIG. 5 is a partial side view of the clamp collar shown in FIG. 4 in this same locked position.

As illustrated in FIGS. 3, 4 and 7, 8, the locking member 45 is formed of a yoke articulated to one of the journals 43a by pivots 43d (just one is visible) so that it collaborates by abutment with the nut 44c in the locked position of FIG. 4. This yoke 45 has two flanges 45a and 45b articulated to the journal 42a, 43a extending laterally on each side of the latter and ending in a locking section 45c that comes into contact with the nut 44c in the locked position to prevent it from turning. This locking section 45c has a cross section in the form of an inverted U, so as to envelope the nut 44c, with the flanges of the U along its sides and the web of this U over its top.

In the example specific to FIGS. 3 and 4, the locking member 45 is able to be clipped reversibly around the nut 44c by elastic compression of its section 45c against the edge corners A of its flats, as can be seen in the locked position of FIG. 4.

Figure 7:
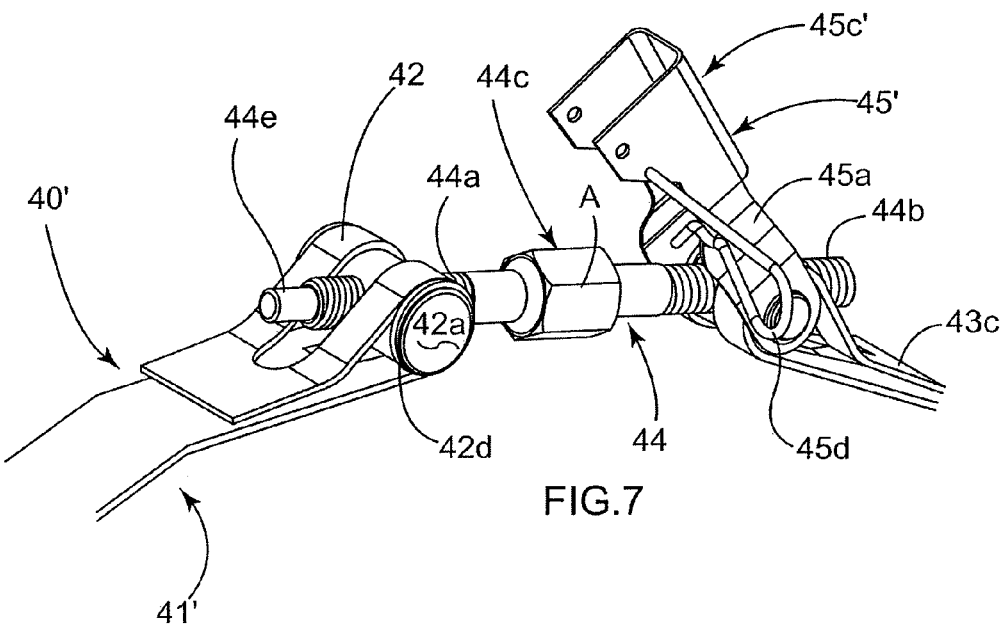
FIG. 7 is a partial perspective view of a clamp collar according to an alternative form of FIG. 3 corresponding to the second embodiment of the invention, showing how the locking member is arranged around the connecting means in the unlocked position.
Figure 8:
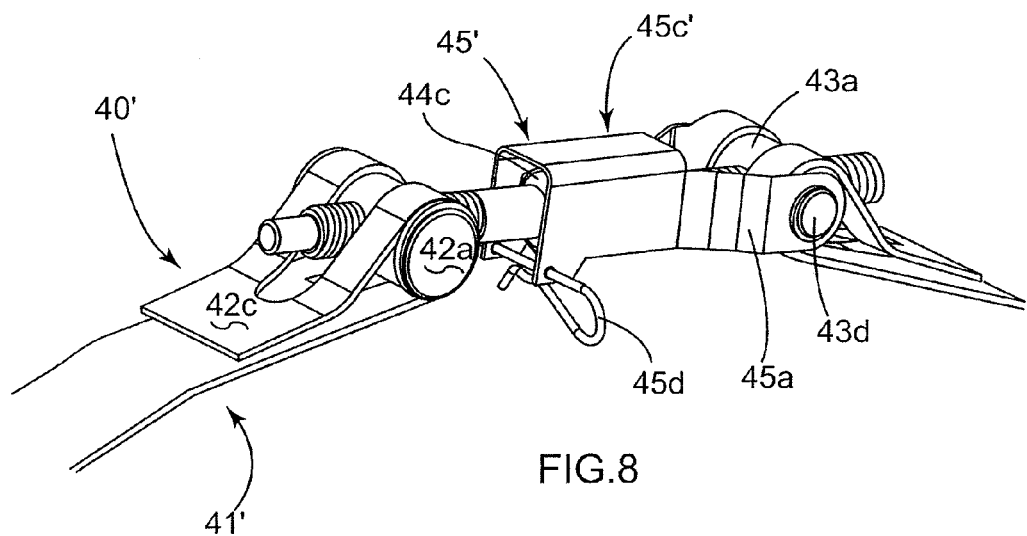
FIG. 8 is a partial perspective view of the clamp collar of FIG. 7 showing how the locking member is fitted around the connecting means in the locked position.

In the example specific to FIGS. 7 and 8, the locking member 45' is of the non-clippable type, being able to be mounted in contact with the nut 44c via the flanges and the web of its section 45c', it also being fitted with a transverse pin 45d, for example of the beta type, mounted removably through these flanges and directly under the nut 44c in the locked position.

As indicated hereinabove, the locking member 45, 45' according to the invention is able to provide reliable tightening of the collar 40, 40' in use even under high stress, putting up effective opposition against the loosening thereof.

To make it easier to insert and then tighten the threaded shank 44 in the journals 42a and 43a, it is possible to envisage providing a stub 44e at one or each of the two ends of this shank 44, beyond the or each corresponding screw thread 44a, 44b (just one stub 44d is depicted in these figures beyond the screw thread 44a at the opposite end to the pivots 43d of the locking member 45, 45').

In order to prevent each journal 42a, 43a from rotating on itself in the corresponding loop of the band 41, 41', it is also possible to provide a stop (not illustrated), which encourages a set positioning of this journal 42a, 43a, such as a "boss" on the outside diameter thereof created by adding a component such as a grooved nail for example.

The invention claimed is:

1. Clamp collar comprising a band made of metal, having at least one pair of ends spaced apart in the circumferential direction, connecting means for connecting the or each pair of ends together with adjustable tightening in this direction and a locking member for locking the connecting means, characterized in that this member is mounted solid with one of these ends and is able to occupy an unlocked position in which this member is disengaged from these means for tightening and loosening the collar and a locked position in which this member engages with them to oppose this loosening.

2. The Clamp collar according to claim 1, characterized in that the connecting means are able to move said ends closer together or further apart through a rotation applied to these means in a direction of tightening or of loosening the collar respectively, and in that the locking member is designed to oppose the turning of these means in the locked position.

3. The Clamp collar according to claim 2, characterized in that the connecting means comprise at least one cylindrical shank having, at respective end portions thereof, two screw threads of opposite hand which are guided in rotation in two first and second transverse journals fixed to said ends that are to be connected, under the control of an operating member that operates this shank and rotates as one with a central portion thereof, the locking member being pivot-mounted on the first journal so that the locking member can cooperate by abutment with this operating member in the locked position.

4. The Clamp collar according to claim 3, characterized in that the locking member is formed of an articulated yoke having two flanges which are pivot-mounted on said first journal while extending laterally on each side thereof and ending in a locking section designed to closely surround said operating member in the locked position so as to prevent said operating member from turning.

5. The Clamp collar according to claim 4, characterized in that said locking member is in the form of a multi-flat nut, said locking section having a cross section substantially in the shape of an inverted U designed to be mounted in contact with said operating member in the locked position, with the flanges of the U along its sides and the web of this U over its top.

6. The Clamp collar according to claim 5, characterized in that said locking section is able to be clipped reversibly around said operating member, while being compressed elastically against edge corners of said flats, at least by said flanges.

7. The Clamp collar according to claim 5, characterized in that said locking section is able to come into contact with said operating member by said flanges and said web of the U, this section also being fitted with a transverse pin mounted removably through these flanges and directly under the operating member in the locked position.

8. The Clamp collar according to claim 3, characterized in that said ends that are to be connected are curved radially outward and in opposite directions from one another each forming a loop of one piece with the remainder of the band, said journals being enveloped by the respective curved parts of these loops and being immobilized therein by retaining means.

9. The Clamp collar according to claim 8, characterized in that said curved part of each end that is to be connected is holed to allow the respective screw threads of said shank to pass, which screw threads are respectively guided in two open-ended tapped orifices formed in said journals with tappings of opposite hand.

10. The clamp collar according to claim 9, characterized in that said retaining means of each journal comprise two elastic rings which surround the two lateral ends of at least said second journal so as to prevent any lateral translational movement of this/these journal/journals in the corresponding loop.

11. The Clamp collar according to claim 8, characterized in that said retaining means of each journal comprise two elastic rings which surround the two lateral ends of at least said second journal so as to prevent any lateral translational movement of this/these journal/journals in the corresponding loop.

12. A Run-flat device intended to be fitted to a tubeless mounted assembly for a motor vehicle which comprises a wheel rim and a tire mounted on the rim, the device being intended to support the tire following a drop in inflation pressure, and comprising:
- a support ring having a radially external support face which is intended to support the tire under run-flat conditions and in which at least one radial recess is formed circumferentially, and
- at least one clamp collar surrounding the ring so as to keep it substantially in contact with the rim under running conditions and which is pressed against this radial recess set back into the support face, characterized in that the clamp collar is as defined in claim 1.

\* \* \* \* \*